(12) United States Patent
Kim et al.

(10) Patent No.: US 11,117,425 B2
(45) Date of Patent: Sep. 14, 2021

(54) TIRE WITH REDUCED NOISE

(71) Applicant: Hankook Tire Co., Ltd., Seoul (KR)

(72) Inventors: Ki Bum Kim, Daejeon (KR); Su Jin Son, Seoul (KR); Il Sik Kim, Daejeon (KR); Chang Hyo Hong, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 274 days.

(21) Appl. No.: 16/207,583

(22) Filed: Dec. 3, 2018

(65) Prior Publication Data

US 2020/0047563 A1 Feb. 13, 2020

(30) Foreign Application Priority Data

Aug. 13, 2018 (KR) .................. 10-2018-0094636

(51) Int. Cl.
*B60C 11/13* (2006.01)
*B60C 19/00* (2006.01)

(52) U.S. Cl.
CPC ........ *B60C 19/002* (2013.01); *B60C 11/1307* (2013.01); *B60C 2011/1338* (2013.01)

(58) Field of Classification Search
CPC ... B60C 11/13; B60C 11/1307; B60C 19/002; B60C 2011/1338; B60C 23/19; B60C 13/00
See application file for complete search history.

(56) References Cited

U.S. PATENT DOCUMENTS

| | | | |
|---|---|---|---|
| 6,124,667 A | 9/2000 | Komiya et al. | |
| 6,601,280 B1 * | 8/2003 | Kleckner | B60C 11/0309 152/209.21 |
| 8,181,682 B2 | 5/2012 | Miyazaki | |
| 2009/0145529 A1 | 6/2009 | Miyazaki | |
| 2010/0180994 A1 * | 7/2010 | Yamaguchi | B60C 11/042 152/153 |
| 2011/0041971 A1 * | 2/2011 | Kuroishi | B60C 13/02 152/153 |

FOREIGN PATENT DOCUMENTS

| | | | | |
|---|---|---|---|---|
| JP | 2008068716 A | * | 3/2008 | ......... B60C 17/0045 |
| JP | 2009137518 A | | 6/2009 | |
| JP | 2012218471 A | * | 11/2012 | |
| KR | 101042309 B1 | | 6/2011 | |

OTHER PUBLICATIONS

Korean Office Action dated Nov. 28, 2018, by the Korean Patent Office in corresponding Korean Patent Application No. 10-2018-0094636. (6 pages).

* cited by examiner

*Primary Examiner* — Steven D Maki
*Assistant Examiner* — Cedrick S Williams
(74) *Attorney, Agent, or Firm* — Novick, Kim & Lee, PLLC; Jae Youn Kim; Jihun Kim

(57) ABSTRACT

Disclosed is a tire configured for reducing noise during running of the tire by forming a predetermined shape in a groove of the tire to reduce a peak of air column resonance sound. The tire with reduced noise includes a first protrusion formed on a sidewall of a groove, protruding in a depth direction of the groove, and dispersing sound waves generated in a tread, and a second protrusion formed on the sidewall of the groove, protruding in a longitudinal direction of the groove, and dispersing sound waves generated in the tread.

7 Claims, 3 Drawing Sheets

TIRE WITH REDUCED NOISE

BACKGROUND OF THE INVENTION

Field of the Invention

The present invention relates to a tire with reduced noise, and more particularly, to a tire capable of reducing noise occurring during running of the tire by forming a predetermined shape in a groove of the tire to reduce a peak of air column resonance sound.

Description of the Related Art

A vehicle moving forward by rolling its wheels inherently causes noise. However, harsh noises such as engine sound and wind noise (wind sound) from both inside and outside the vehicle while driving always displease a driver and passengers. Accordingly, it is common to cut off noise using soundproof materials, sound-absorbing materials, or the like.

In recent years, the Korean Ministry of Environment is introducing the "Tire Noise Performance Indication System" which is in force in the European Union (EU). In order to respond to the enforcement of the system, domestic and foreign automobile industry is making efforts to reduce noise. In the past, a focus was made on reducing in-vehicle noise such as engine noise. However, in order to minimize noise occurring outside the vehicle such as tires, new low-noise technology is being increasingly applied from the early stage of tire product development.

In particular, tires for electric vehicles, the market share of which is rapidly increasing recently, require different noise characteristics from those for internal combustion engines (ICEs). In the case of an ICE vehicle, an engine causes the largest noise throughout the entire range of interior noise. However, since there is no engine in an EV, the overall noise level is low and low noise tires have become increasingly important.

Korean Patent No. 10-1042309 (entitled "Groove Pattern Structure of Tire Tread for Noise Reduction") discloses a groove pattern structure of tire treads for noise reduction, in which cavity grooves 3 are connected at regular intervals between a plurality of main grooves 2 in a running direction of a tire in a tread 1, wherein neck grooves 1 and 2 (4a and 4b) are formed at portions where the cavity grooves 3 and the main grooves 2 are interconnected, respectively, so that the neck grooves 1 and 2 (4a and 4b) connect the cavity grooves 3 and the main grooves 2.

CITATION LIST

Patent Literature

Patent Literature 1: Korean Patent No. 10-1042309

SUMMARY OF THE INVENTION

The present invention has been made in view of the above-mentioned problems, and an object thereof is to reduce noise of a tire by reducing a peak of air column resonance sound occurring during running of the tire.

The present invention is not limited to the above-mentioned object, and other objects of the present invention can be clearly understood by those skilled in the art to which the present invention pertains from the following description.

To accomplish the object described above, a tire with reduced noise, in which a block, a kerf, and a groove are formed on a tread, according to an aspect of the present invention includes a first protrusion formed on a sidewall of the groove, protruding in a depth direction of the groove, and dispersing sound waves generated in the tread, and a second protrusion formed on the sidewall of the groove, protruding in a longitudinal direction of the groove, and dispersing sound waves generated in the tread, wherein the first and second protrusions reduce noise of the tire by dispersing the sound waves.

In the aspect of the present invention, the first protrusion may include a first upper protrusion formed at an upper portion on the sidewall of the groove, and a first lower protrusion formed at a lower portion on the sidewall of the groove and having a relatively greater protruding height than the first upper protrusion.

In the aspect of the present invention, the protruding height of the first lower protrusion may be reduced as the first lower protrusion gets close to a bottom surface of the groove.

In the aspect of the present invention, the protruding height of the first lower protrusion may be 1.5 to 3 times that of the first upper protrusion.

In the aspect of the present invention, the first or second protrusion may have a polygonal protruding cross-section.

In the aspect of the present invention, the second protrusion may have a width of 0.1 to 10 mm in the depth direction of the groove.

In the aspect of the present invention, a plurality of first protrusions may be continuously arranged to form a protrusion module, and the second protrusion may be positioned between one protrusion module and another protrusion module.

In the aspect of the present invention, a distance between the first protrusions forming the protrusion module may be 1.5 to 2.5 mm.

DETAILED DESCRIPTION OF THE PREFERRED EMBODIMENTS

Figure 1:
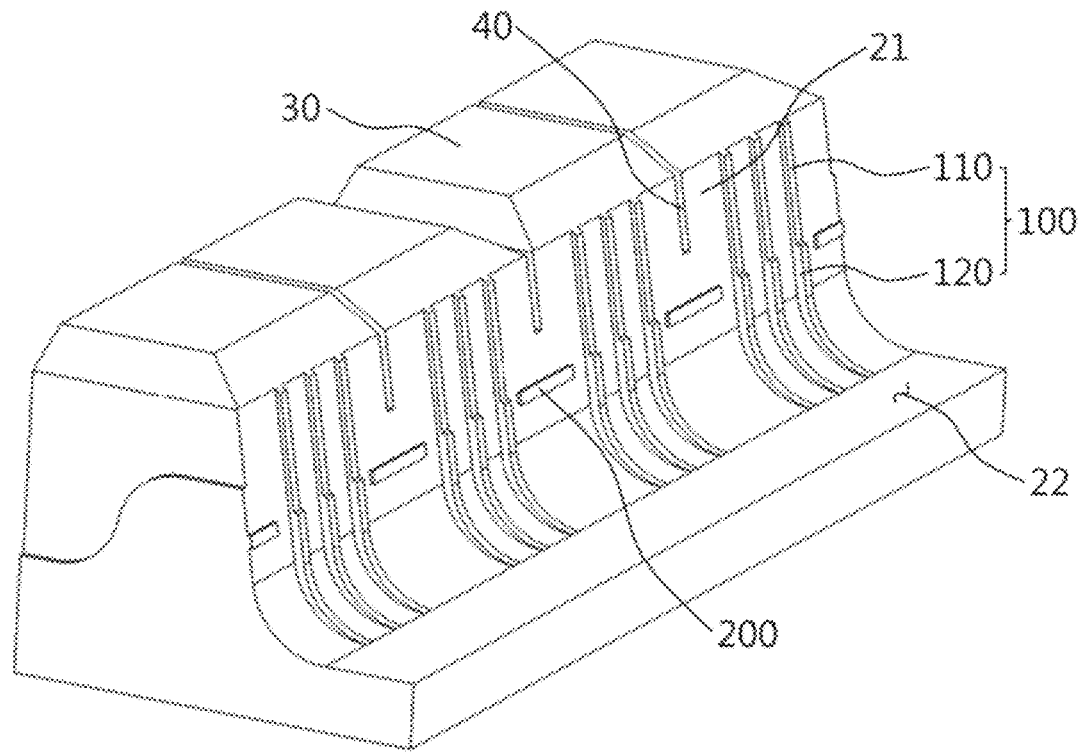
FIG. 1 is a perspective view illustrating a portion of a groove according to an embodiment of the present invention.

Reference will now be made in detail to exemplary embodiments of the present invention, examples of which are illustrated in the accompanying drawings. The present invention may, however, be embodied in different forms and should not be construed as limited to the embodiments set forth herein. For clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, exemplary embodiments of the present invention will be described in detail with reference to the accompanying drawings.

Figure 2:
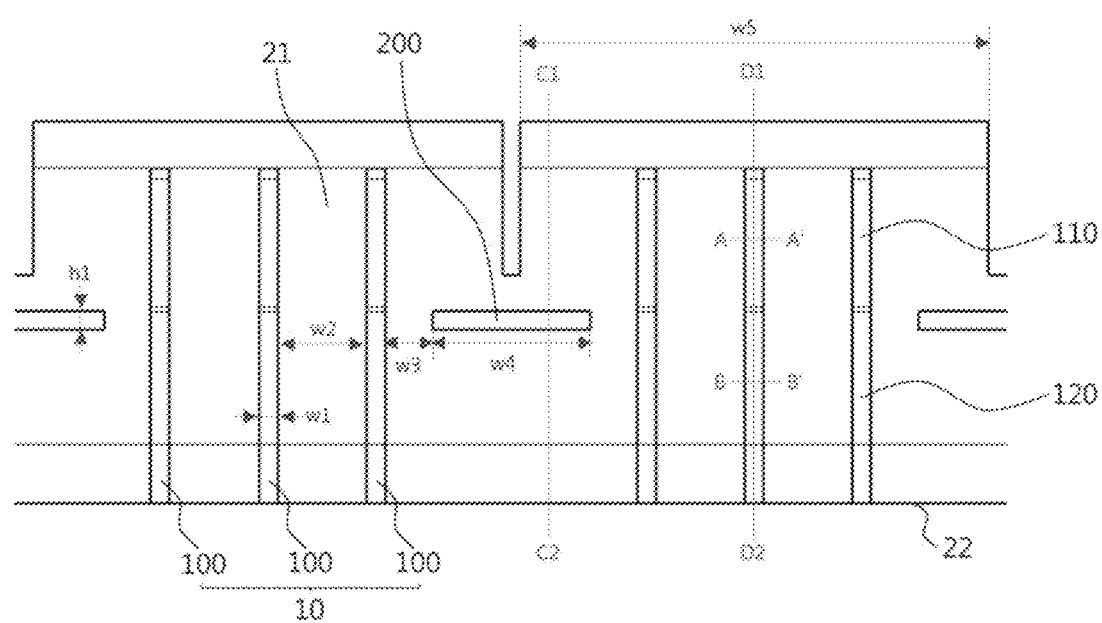
FIG. 2 is a front view illustrating a portion of the groove according to the embodiment of the present invention.
Figure 3:
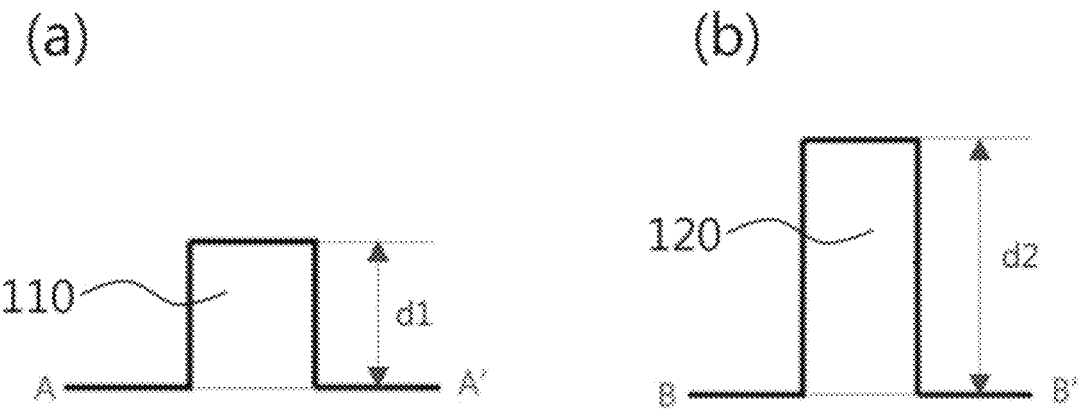
FIG. 3 is a cross-sectional view illustrating a first upper protrusion and a first lower protrusion according to the embodiment of the present invention.
Figure 4:
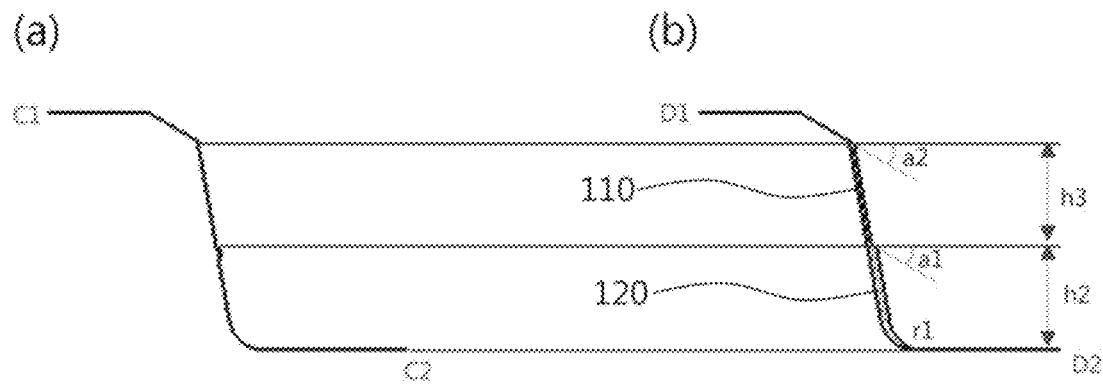
FIG. 4 is a cross-sectional view illustrating a portion of a block according to the embodiment of the present invention.

FIG. 1 is a perspective view illustrating a portion of a groove according to an embodiment of the present invention. FIG. 2 is a front view illustrating a portion of the groove according to the embodiment of the present invention. FIG. 3 is a cross-sectional view illustrating a first upper protrusion 110 and a first lower protrusion 120 according to the embodiment of the present invention. FIG. 4 is a cross-sectional view illustrating a portion of a block 30 according to the embodiment of the present invention.

FIG. 3($a$) is a cross-sectional view of the first upper protrusion 110 taken along line A-A' of FIG. 2, and FIG. 3($b$) is a cross-sectional view of the first lower protrusion 120 taken along line B-B' of FIG. 2. FIG. 4($a$) is a cross-sectional view of the block 30 taken along line C1-C2 of FIG. 2, and FIG. 4($b$) is a cross-sectional view of the block 30 taken along line D1-D2 of FIG. 2.

As illustrated in FIGS. 1 to 4, a tire of the present invention, in which a block 30, a kerf 40, and a groove are formed on a tread, includes a first protrusion 100, which is formed on a sidewall 21 of the groove, protrudes in the depth direction of the groove, and disperses sound waves generated in the tread, and a second protrusion 200 which is formed on the sidewall 21 of the groove, protrudes in the longitudinal direction of the groove, and disperses sound waves generated in the tread. The noise of the tire can be reduced by dispersing the sound waves by the first and second protrusions 100 and 200.

As illustrated in FIG. 1, the block 30 formed on the tread has an inclined surface formed on the upper end thereof, and the kerf 40 between one block 30 and another block 30 may be formed in a direction across the center therebetween.

The first protrusion 100 may include a first upper protrusion 110 that is formed at the upper portion on the sidewall 21 of the groove, and a first lower protrusion 120 that is formed at the lower portion on the sidewall 21 of the groove and has a relatively greater protruding height than the first upper protrusion 110. Here, the protruding height may mean a maximum length of the first upper protrusion 110, the first lower protrusion 120, or the second protrusion 200 protruding from the sidewall 21 of the groove in a direction perpendicular thereto. Hereinafter, the same applies.

The first and second protrusions 100 and 200 are formed on the sidewall 21 of the groove as described above, thereby enabling the sound waves generated in the tread to be split by colliding with a plurality of surfaces formed on the groove and be dispersed or absorbed. Accordingly, since the space of the groove is instantaneously in the form of tubular space by the contact between the groove and the ground when the tire runs, air column resonance sounds, which are noise caused by the form of tubular space, are dispersed or absorbed by colliding with the surfaces formed on the groove, thereby enabling the noise of the tire to be reduced.

The first protrusion 100 may have a stepped outer surface since the first upper protrusion 110 and the first lower protrusion 120 have different protruding heights d1 and d2. Accordingly, an air wave flowing in the upper space of the groove where the first upper protrusion 110 is positioned differs from that flowing in the lower space of the groove where the first lower protrusion 120 is positioned, and an air wave colliding with the first protrusion 100 and the second protrusion 200 while flowing in the space of the groove by the first protrusion 100 is irregularly changed. Thus, the effect of splitting and dispersing the sound waves passing through the space of the groove can be increased.

The first lower protrusion 120 may have a curved portion and the lower portion of the groove may have a U-shaped cross-section. Correspondingly, the first lower protrusion 120 may have a curved portion formed along the curved portion of the sidewall 21 of the groove. Therefore, it is possible to improve the durability of the block 30 that receives forces from many directions when the tire runs. In addition, since the first protrusion 100 has a curved shape, it is possible to prevent the first protrusion 100 from being damaged due to the irregular shape deformation of the block 30.

The protruding height d2 of the first lower protrusion 120 may be reduced as the first lower protrusion 120 gets close to a bottom surface 22 of the groove. Thus, the influence of the first protrusion 100 on the fluid passing through the groove may decrease as the first protrusion 100 gets close to the bottom surface 22 of the groove. When the tire runs on the wet road surface, the groove performs a drainage function and a water pressure may increase as water introduced into the groove moves closer to the bottom surface 22 of the groove while flowing through the groove. The drainage function may be deteriorated when the flow of water, the pressure of which is increased, is disturbed by the first protrusion 100 or the second protrusion 200. Consequently, by reducing the protruding height d2 of the first lower protrusion 120 as it gets close to the bottom surface 22 of the groove, it is possible to prevent a deterioration in drainage of water flowing close to the bottom surface 22 of the groove.

As illustrated in FIG. 3, the protruding height d2 of the first lower protrusion 120 may be set to be 1.5 to 3 times the protruding height d1 of the first upper protrusion 110. If the protruding height d2 of the first lower protrusion 120 is less than 1.5 times the protruding height d1 of the first upper protrusion 110 or if the first lower protrusion 120 and the first upper protrusion 110 have the same protruding height, the difference between air waves in the upper and lower spaces of the groove is small. As a result, the effect of dispersing the sound waves passing through the space of the groove may be deteriorated. If the protruding height d2 of the first lower protrusion 120 is more than 3 times the protruding height d1 of the first upper protrusion 110, the drainage function of the groove may be deteriorated since the lower space volume of the groove is significantly reduced.

The protruding height d1 of the first upper protrusion 110 may be 0.05 to 0.25 mm, and the protruding height d2 of the first lower protrusion 120 may be formed so as to be suitable for the protruding height ratio of the first lower protrusion 120 to the first upper protrusion 110 as described above. If the protruding height d1 of the first upper protrusion 110 is less than 0.05 mm, the area of the first protrusion 100 is reduced, thereby deteriorating the effect of dispersing and absorbing the sound waves colliding with the first protrusion 100. In addition, the magnitude of the air wave colliding with the first upper protrusion 110 and the first lower protrusions 120 is reduced while the difference between air waves flowing in the upper and lower spaces of the groove is also reduced. Hence, the effect of dispersing the sound waves passing through the space of the groove may be deteriorated.

The first protrusion 100 or the second protrusion 200 may have a polygonal protruding cross-section. Here, each of the first upper protrusion 110 and the first lower protrusion 120 may have a square cross-section as illustrated in FIG. 3. However, the cross-sectional shape of the first upper protrusion 110 and the first lower protrusion and 120 is not necessarily limited to a polygonal shape.

As illustrated in FIG. 4(b), the upper surface of the first lower protrusion 120 may have a slope by forming a first angle a1 with the bottom surface 22 of the groove, and the first angle a1 may be 10 to 90 degrees. The inclined surface of the upper end of the block 30 may have a slope by forming a second angle a2 with the bottom surface 22 of the groove, and the second angle a2 may be 10 to 90 degrees.

The second protrusion 200 may have a width h1 of 0.1 to 10 mm in the depth direction of the groove. If the width h1 of the second protrusion 200 is less than 0.1 mm, the area of the second protrusion 200 is reduced, thereby deteriorating the effect of dispersing and absorbing the sound waves colliding with the second protrusion 200. In addition, since the magnitude of the air wave colliding with the second protrusion 200 is reduced, the effect of dispersing the sound waves passing through the space of the groove may be deteriorated. If the width hl of the second protrusion 200 is more than 10 mm, the volume of the second protrusion 200 increases due to the increase of the width hl of the second protrusion 200, which may deteriorate the effect of dispersing the sound waves by the first protrusion 100.

Since the second protrusion 200 functions to assist the function of the first protrusion 100, the protruding height of the second protrusion 200 may be set to be 0.3 to 1 times the protruding height dl of the first upper protrusion 110.

As illustrated in FIG. 2, a protrusion module 10 may be formed by continuously arranging a plurality of first protrusions 100, and the second protrusion 200 may be positioned between one protrusion module 10 and another protrusion module 10. Here, the number of first protrusions 100 forming the protrusion module 10 may be variable with the width w5 of the block 30.

Here, the first protrusion 100 may have a width w1 of 0.1 to 0.7 mm. If the width w1 of the first protrusion 100 is less than 0.1 mm, the durability of the first protrusion 100 is deteriorated, which may lead to the damage of the first protrusion 100 when the tire runs. If the width w1 of the first protrusion 100 is more than 0.7 mm, the effect of generating the air wave colliding with the first protrusion 100 is deteriorated, which may deteriorate the effect of dispersing the sound waves passing through the space of the groove.

The distance w2 between the first protrusions 100 forming the protrusion module 10 may be 1.5 to 2.5 mm. If the distance w2 between the first protrusions 100 in the protrusion module 10 is less than 1.5 mm, the ratio of the air or sound wave colliding with the side surface of the first protrusion 100 abutting against the sidewall 21 of the groove is lowered. Hence, the effect of generating the air wave may be deteriorated, and at the same time, the effect of dispersing the sound waves may also be deteriorated. If the distance w2 between the first protrusions 100 in the protrusion module 10 is more than 2.5 mm, the number of first protrusions 100 forming the protrusion module 10 is significantly reduced. Similarly, the ratio of the air or sound wave colliding with the side surface of the first protrusion 100 is lowered, which may simultaneously deteriorate the effect of generating the air wave and the effect of dispersing the sound waves.

The distance w3 between the second protrusion 200 and the first protrusion 100 position closest thereto may be 0.5 to 1.5 mm. If the distance w3 between the second protrusion 200 and the first protrusion 100 is less than 0.5 mm, the distance therebetween is significantly reduced and the change efficiency of the air wave passing between the second protrusion 200 and the first protrusion 100 may be reduced. If the distance w3 between the second protrusion 200 and the first protrusion 100 is more than 1.5 mm, the number of first protrusions 100 forming the protrusion module 10 is significantly reduced. Hence, the ratio of the air or sound wave colliding with the side surface of the first protrusion 100 is lowered, which may simultaneously deteriorate the effect of generating the air wave and the effect of dispersing the sound waves.

The width w4 of the second protrusion 200, the height h2 of the first upper protrusion 110, and the height h3 of the first lower protrusion 120 in the longitudinal direction of the groove (in the circumferential direction of the tire) may be variable with the depth of the groove and the size of the block 30.

EXAMPLE

A model reproducing Example is prepared in which three first protrusions 100 form the protrusion module 10, the protruding height d1 of the first upper protrusion 110 is 0.15 mm, the protruding height d2 of the first lower protrusion 120 is 0.3 mm, each of the first and second angles a1 and a2 are 45 degrees, the width h1 of the second protrusion 200 is 0.4 mm, the height h2 of the first upper protrusion 110 is 2.3 mm, and the height h3 of the first lower protrusion 120 is 3 mm, the width w1 of the first protrusion 100 is 0.4 mm, the distance w2 between the first protrusions 100 is 1.9 mm, the distance w3 between the second protrusion 200 and the first protrusion 100 positioned closest thereto is 1 mm, the width w4 of the second protrusion 200 is 2.4 mm, and the width w5 of the block 30 is 7.5 mm. In order to verify the effect of reducing the air column resonance of the Example model, the air column resonance sound of the Example model is measured. To this end, the Q-source, which is an air volume exciter, and the microphone for noise measurement are used.

Comparative Example

A model reproducing the conventional tire in which knurling is not performed on the groove is prepared. In order to compare the Comparative Example model with the Example model, the air column resonance sound of the Comparative Example model is measured. To this end, the Q-source, which is an air volume exciter, and the microphone for noise measurement are used.

Figure 5:
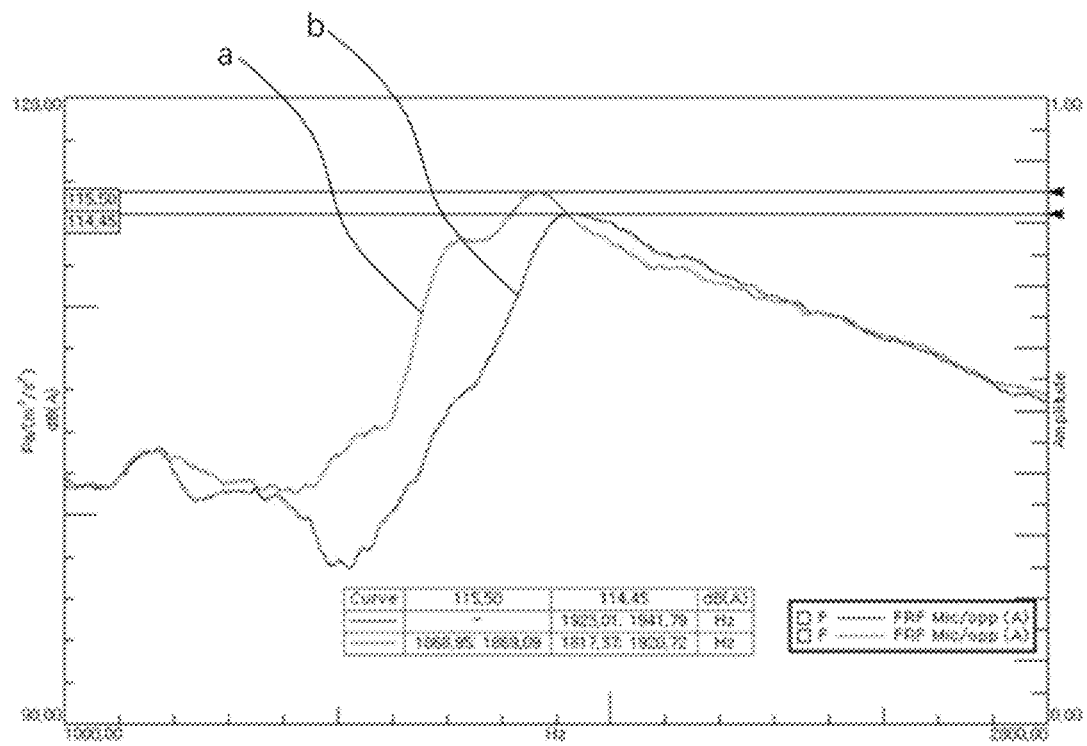
FIG. 5 is a comparative graph illustrating measurement of peaks in the band of air column resonance sound of a groove model in Comparative Example and in the band of air column resonance sound of a groove model in Example according to the embodiment of the present invention.

FIG. 5 is a comparative graph illustrating measurement of peaks in the band of air column resonance sound of the groove model in Comparative Example and in the band of air column resonance sound of the groove model in Example according to the embodiment of the present invention. In detail, Graph a illustrates the air column resonance sound of the groove model in Comparative Example, and Graph b illustrates the air column resonance sound of the groove model in Example.

As illustrated in Graphs a and b of FIG. 5, when the air column resonance sound of the groove model is measured in Comparative Example, the peak value of the air column resonance sound is measured at 115.5 decibels (dB). When the air column resonance sound of the groove model is measured in Example, the peak value of the air column resonance sound is measured at 114.45 decibels (dB).

Figure 6:
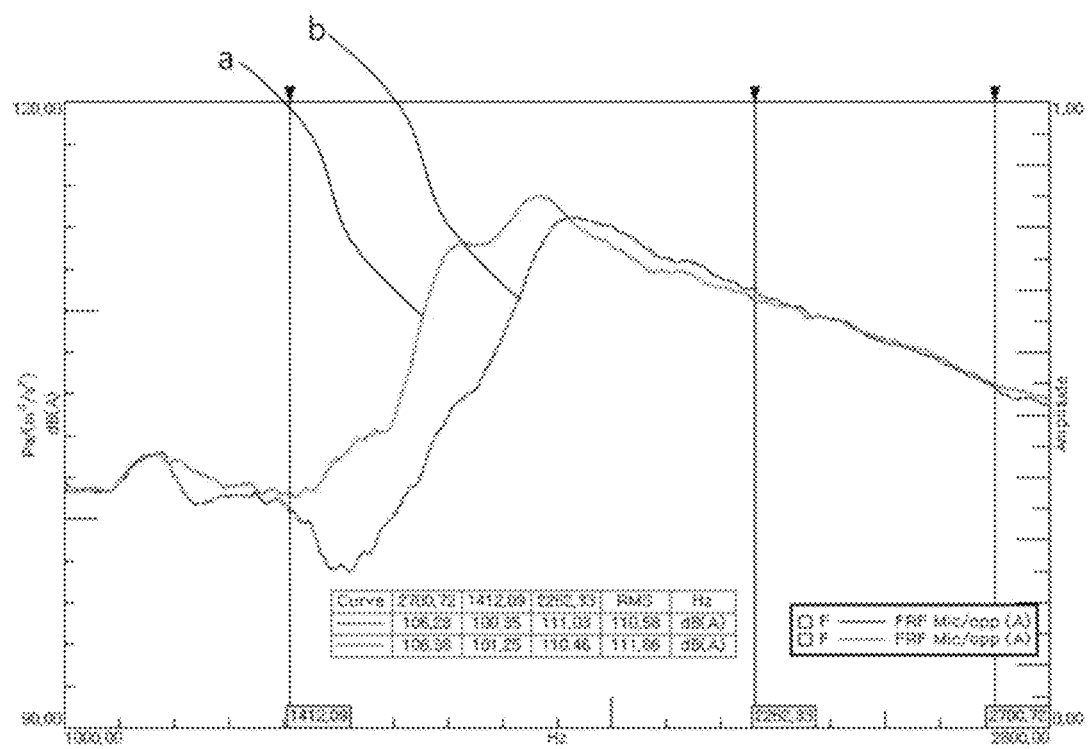
FIG. 6 is a comparative graph illustrating measurement of RMSs in the band of air column resonance sound of the groove model in Comparative Example and in the band of air column resonance sound of the groove model in Example according to the embodiment of the present invention.

FIG. 6 is a comparative graph illustrating measurement of RMSs in the band of air column resonance sound of the groove model in Comparative Example and in the band of air column resonance sound of the groove model in Example according to the embodiment of the present invention. In detail, Graph a illustrates the air column resonance sound of the groove model in Comparative Example, and Graph b illustrates the air column resonance sound of the groove model in Example.

As illustrated in Graphs a and b of FIG. 6, when the air column resonance sound of the groove model is measured in Comparative Example, the RMS value in the band of air column resonance sound is measured at 111.86 decibels (dB). When the air column resonance sound of the groove model is measured in Example, the RMS value in the band of air column resonance sound is measured at 110.58 decibels (dB).

As described above, when the groove model of Example according to the embodiment of the present invention and the conventional groove model of Comparative Example are executed, respectively, the peak value of air column resonance sound and the RMS value in the band of air column resonance sound in the groove model of Example are smaller than those in the groove model of Comparative Example. Therefore, it can be seen that the effect of reducing the noise of the tire of the present invention is improved.

The present invention with the above-mentioned configuration has an effect of reducing noise occurring during running of the tire by forming a predetermined shape in the groove of the tire to reduce the peak of air column resonance sound.

In addition, the present invention is effective in that the drainage function of the groove is not deteriorated even though a predetermined shape is formed in the groove of the tire to reduce the peak of air column resonance sound.

The present invention is not limited to the above effects, and it should be understood that the present invention includes all effects which can be inferred from the detailed description of the present invention or the configuration of the invention defined by the appended claims.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

What is claimed is:

1. A tire configured for reducing noise, the tire comprising:
   a tread having a block and a groove;
   a first protrusion formed on a sidewall of the groove, protruding in a depth direction of the groove; and
   a second protrusion formed on the sidewall of the groove, protruding in a longitudinal direction of the groove,
   wherein the first protrusion and second protrusion are configured and arranged to reduce noise of the tire by dispersing sound waves,
   wherein the first protrusion includes a first upper protrusion and a first lower protrusion respectively formed at an upper portion and a lower portion on the sidewall of the groove,
   wherein the first lower protrusion has a curved portion formed along a curved surface of the sidewall adjacent to a bottom surface of the groove, and
   wherein a protruding height of the first lower protrusion at the curved portion is continuously reduced in a direction of the first lower protrusion toward the bottom surface of the groove.

2. The tire according to claim 1, wherein the first protrusion or second protrusion has a polygonal protruding cross-section.

3. The tire according to claim 1, wherein the second protrusion has a width of 0.1 to 10 mm in the depth direction of the groove.

4. The tire according to claim 1, comprising a plurality of first protrusions is continuously arranged to form a protrusion module, the second protrusion being positioned between one protrusion module and another protrusion module.

5. The tire according to claim 4, wherein a distance between the first protrusions forming the protrusion module is 1.5 to 2.5 mm.

6. The tire according to claim 1,
   wherein the first lower protrusion has a greater protruding height than the first upper protrusion.

7. The tire according to claim 6, wherein the protruding height of the first lower protrusion is 1.5 to 3 times that of the first upper protrusion.

* * * * *